(12) United States Patent
Todaka et al.

(10) Patent No.: US 12,388,317 B2
(45) Date of Patent: Aug. 12, 2025

(54) ROTARY ELECTRIC MACHINE HOUSING, ROTARY ELECTRIC MACHINE, AND ADDITIVE MANUFACTURING METHOD

(71) Applicant: HONDA MOTOR CO., LTD., Tokyo (JP)

(72) Inventors: Hirosumi Todaka, Saitama (JP); Yasunari Kimura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 270 days.

(21) Appl. No.: 18/128,623

(22) Filed: Mar. 30, 2023

(65) Prior Publication Data
US 2023/0318394 A1    Oct. 5, 2023

(30) Foreign Application Priority Data

Mar. 31, 2022  (JP) ................................. 2022-060373

(51) Int. Cl.
| | |
|---|---|
| *H02K 5/20* | (2006.01) |
| *B33Y 80/00* | (2015.01) |
| *H02K 5/173* | (2006.01) |
| *H02K 7/08* | (2006.01) |
| *H02K 7/18* | (2006.01) |

(52) U.S. Cl.
CPC ............. *H02K 5/203* (2021.01); *B33Y 80/00* (2014.12); *H02K 5/1732* (2013.01); *H02K 7/083* (2013.01); *H02K 7/1823* (2013.01)

(58) Field of Classification Search
CPC ...... H02K 5/203; H02K 5/1732; H02K 7/083; H02K 7/1823; H02K 5/20; H02K 5/18; H02K 5/207; H02K 5/22; H02K 9/14; H02K 9/16; H02K 9/18; H02K 9/19; H02K 9/22; H02K 9/08; H02K 9/10; H02K 9/12; B33Y 80/00
See application file for complete search history.

(56) References Cited

U.S. PATENT DOCUMENTS

2020/0095934 A1\* 3/2020 Sebastian ............... H02K 5/203
2022/0325632 A1\* 10/2022 Yazaki ..................... F01D 11/02

FOREIGN PATENT DOCUMENTS

JP          2017-028798 A      2/2017

\* cited by examiner

*Primary Examiner* — Alexander A Singh
*Assistant Examiner* — Charlie Frank Mann, Jr.
(74) *Attorney, Agent, or Firm* — Paratus Law Group, PLLC

(57) ABSTRACT

A rotary electric machine housing is configured to accommodate a component of a rotary electric machine. The rotary electric machine housing includes a body portion configured to be in a hollow shape and having an accommodation space in which the component is accommodated, a gas flow path provided with the body portion and communicating with a gas outflow port of an internal combustion engine connected to the rotary electric machine, and a cooling portion configured to cool a gas flowing through the gas flow path. The gas flow path communicates with the accommodation space of the body portion.

10 Claims, 4 Drawing Sheets

ROTARY ELECTRIC MACHINE HOUSING, ROTARY ELECTRIC MACHINE, AND ADDITIVE MANUFACTURING METHOD

CROSS-REFERENCE TO RELATED APPLICATIONS

This application is based on and claims priority under 35 USC 119 from Japanese Patent Application No. 2022-060373 filed on Mar. 31, 2022. The entire content of the priority application is incorporated herein by reference.

TECHNICAL FIELD

The present disclosure relates to a rotary electric machine housing, a rotary electric machine, and an additive manufacturing method.

BACKGROUND ART

In recent years, researches and development that contribute to an energy efficiency have been carried out to ensure access to convenient, reliable, sustainable, and advanced energy for more people.

A rotary electric machine such as a motor or a power generator is required to prevent a decrease in an output in order to improve an energy efficiency. Since the output decreases when a temperature of the rotary electric machine becomes high, it is necessary to provide the rotary electric machine with a cooling mechanism to prevent the decrease in output. For example, JP2017-28798A discloses that cooling water flows through a water jacket provided in a housing of a motor to cool the motor.

An internal combustion engine such as a gas turbine engine may be connected to the rotary electric machine. When studying an energy efficiency of a rotary electric machine, it may be effective to pay attention not only to energy of the rotary electric machine but also to energy of an entire system including the rotary electric machine and the internal combustion engine. For example, it is conceivable to effectively utilize a high-temperature gas generated in the internal combustion engine (for example, a high-temperature compressed air generated by being compressed by a compressor of the internal combustion engine) for the rotary electric machine.

SUMMARY

The present disclosure provides a rotary electric machine housing and a rotary electric machine that utilize a gas generated in an internal combustion engine as a coolant that is supplied to an inside of the rotary electric machine housing. An additive manufacturing method that manufactures such a rotary electric machine housing is also provided.

A first aspect of the present disclosure relates to a rotary electric machine housing configured to accommodate a component of a rotary electric machine, the rotary electric machine housing including:
- a body portion configured to be in a hollow shape and having an accommodation space in which the component is accommodated;
- a gas flow path provided with the body portion and communicating with a gas outflow port of an internal combustion engine connected to the rotary electric machine; and
- a cooling portion configured to cool a gas flowing through the gas flow path, in which the gas flow path communicates with the accommodation space of the body portion.

A second aspect of the present disclosure relates to a rotary electric machine, including:
- the rotary electric machine housing; and
- a rotor and a stator accommodated in the body portion, wherein a rotor shaft of the rotor is connected to a rotating shaft of the internal combustion engine.

A third aspect of the present disclosure relates to an additive manufacturing method of additively manufacturing the rotary electric machine housing by using powder metal, the additive manufacturing method including:
- integrally forming the body portion, the gas flow path, and the cooling portion.

According to the present disclosure, the gas generated in the internal combustion engine can be utilized as the coolant to be supplied to an inside of the rotary electric machine housing.

BRIEF DESCRIPTION OF DRAWINGS

Exemplary embodiment(s) of the present disclosure will be described in detail based on the following figures, wherein.

DESCRIPTION OF EMBODIMENTS

Hereinafter, an embodiment of a rotary electric machine of the present disclosure will be described with reference to the drawings.

Figure 1:
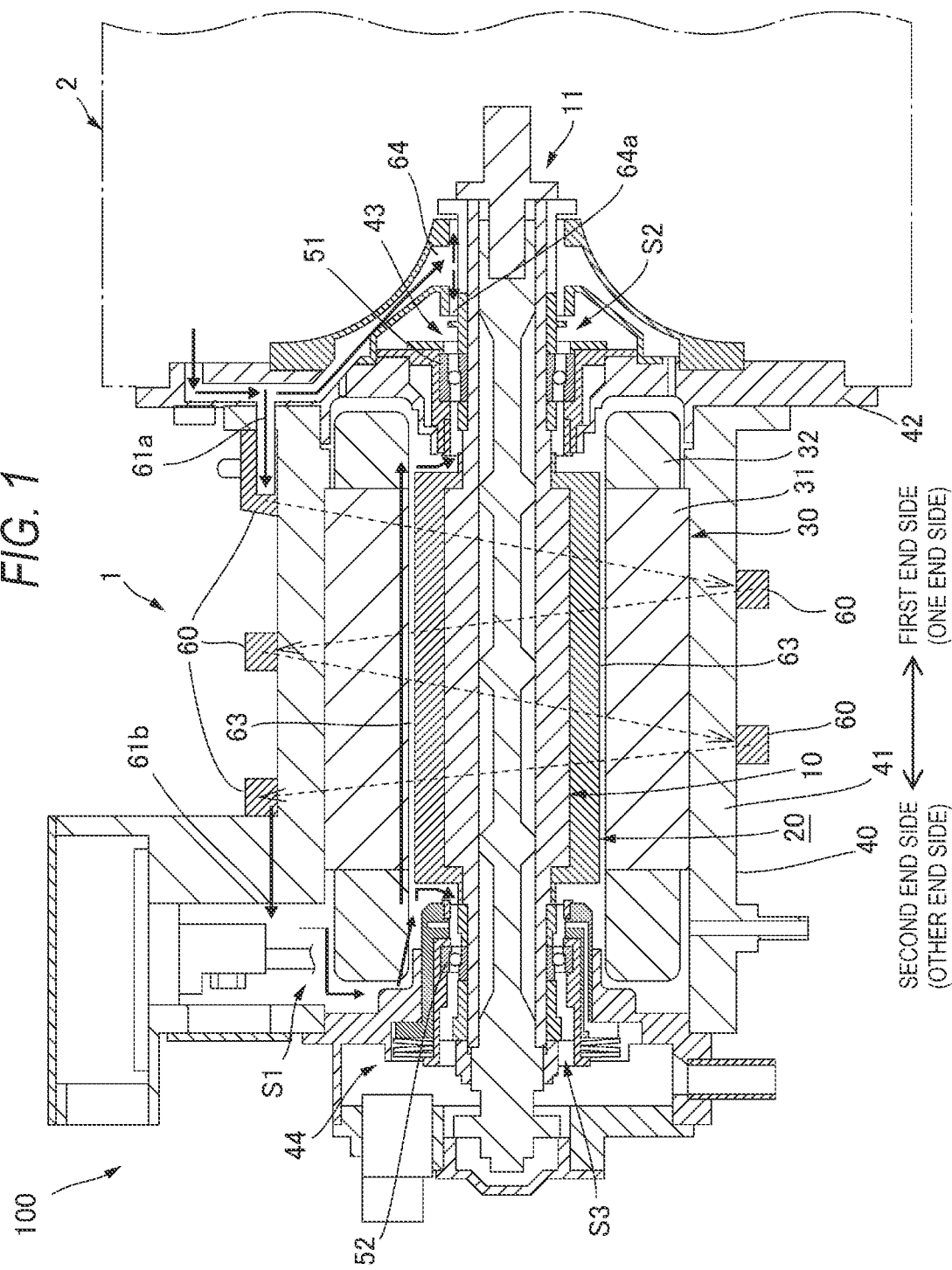
FIG. 1 is a cross-sectional view of a power generator 1.

As shown in FIG. 1, a power generator 1 which is an example of the rotary electric machine of the present disclosure includes a rotor shaft 10, a rotor 20 rotating integrally with the rotor shaft 10, a stator 30 disposed in a radial direction at a predetermined distance from an outer peripheral surface of the rotor 20, a housing 40 that accommodates the rotor 20 and the stator 30, and a pair of bearings 51 and 52 that are disposed on one end side and the other end side in an axial direction with the rotor 20 interposed therebetween and rotatably support the rotor shaft 10 with respect to the housing 40. A permanent magnet (not shown) is attached to the rotor 20, and a coil 32 is wound around a stator core 31 of the stator 30.

A gas turbine engine 2, which is an example of the internal combustion engine, is connected to the power generator 1. Although not shown, the gas turbine engine 2 causes a turbine to rotate by an exhaust flow when a high-temperature and high-pressure combustion gas, which is generated by combusting air and fuel (such as jet fuel) compressed by a compressor in a combustion chamber, is exhausted. The turbine is coaxially connected to a turbine connecting portion 11 provided on the rotor shaft 10 of the power generator 1, and the rotor shaft 10 rotates as the turbine rotates. That is, the power generator 1 and the gas turbine engine 2 constitute a power generation system 100, and the power generator 1 generates power according to an output of the gas turbine engine 2. Hereinafter, a gas turbine engine 2 side in the axial direction of the power generator 1 is also referred to as a first end side, and an opposite side thereof is also referred to as a second end side.

A part of high-temperature and high-pressure air (hereinafter, also simply referred to as gas) generated by being compressed by the compressor of the gas turbine engine 2 flows through a gas outflow path (not shown) of the gas turbine engine 2 and is supplied to a gas introduction portion 60 of the housing 40, which will be described later. The combustion gas exhausted from the gas turbine engine 2 may be supplied to the gas introduction portion 60 of the housing 40 through a purification filter or the like.

The housing 40 includes a hollow body portion 41 and a flange portion 42 provided at an end portion of the body portion 41 on the first end side. The body portion 41 is configured to be in a hollow shape and has a substantially cylindrical shape. The body portion 41 has an accommodation space S1 in which components such as the rotor 20 are accommodated, the stator 30, and the bearings 51 and 52. The flange portion 42 is fixed to the gas turbine engine 2.

Holes through which the rotor shaft 10 can be inserted are formed in the body portion 41 and the flange portion 42, and bearing holding portions 43 and 44 are disposed in the hole portions. The bearing holding portions 43 and 44 are provided at the end portions of the housing 40 on the first end side and the second end side, respectively, and hold the bearings 51 and 52. That is, the bearing holding portions 43 and 44 support, with respect to the housing 40, the bearings 51 and 52 that rotatably support the rotor shaft 10. The bearing holding portions 43 and 44 are provided with an oil flow path, an oil jet nozzle, and the like (not shown) that supplies an oil to the bearings 51 and 52, and the bearings 51 and 52 are lubricated with the oil.

The housing 40 further includes the gas introduction portion 60 for cooling the gas generated by the gas turbine engine 2 and supplying the gas to the accommodation space S1 of the housing 40. Although details will be described later, the gas supplied to the accommodation space S1 is effectively utilized for cooling the rotor 20 and the stator 30, and the like.

Figure 2:
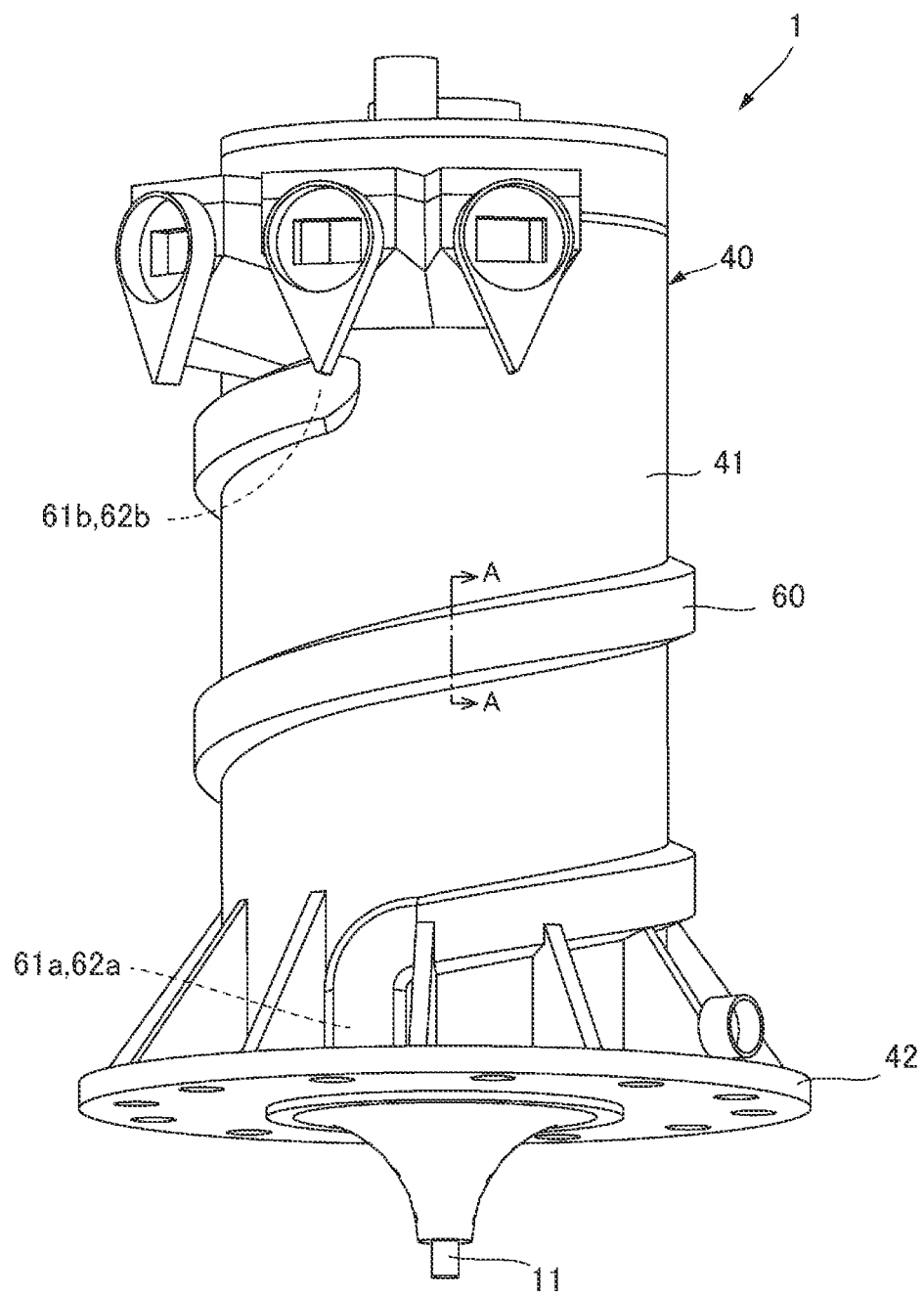
FIG. 2 is a perspective view of a housing 40 of the power generator 1.

As shown in FIG. 2, the gas introduction portion 60 is provided integrally with the body portion 41 and protrudes radially outward from an outer peripheral surface of the body portion 41. In addition, the gas introduction portion 60 is provided to extend spirally from the first end side to the second end side in the axial direction. Thick arrows (solid and dashed lines) illustrated in FIG. 1 indicate a flow of gas.

Figure 3:
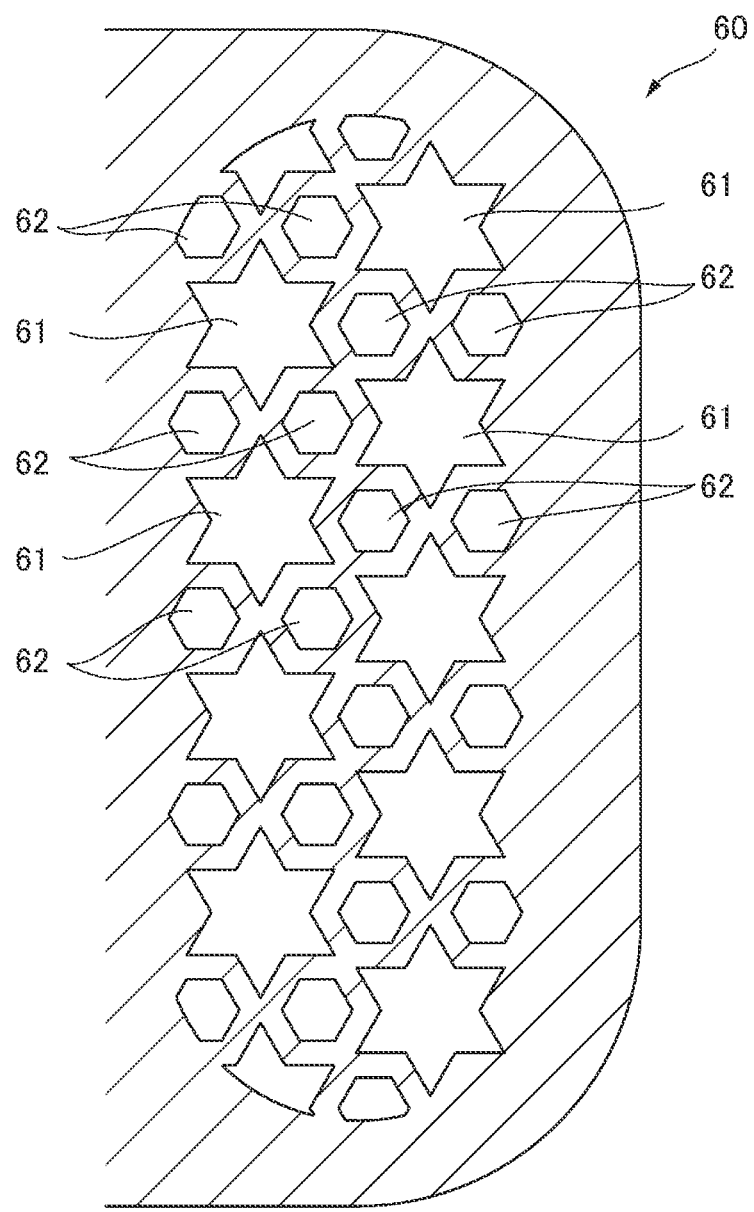
FIG. 3 shows a cross section along A-A in FIG. 2, and is a cross-sectional view showing a gas flow path 61 and a coolant flow path 62.

As shown in FIG. 3, inside the gas introduction portion 60, gas flow paths 61 through which the gas flows and coolant flow paths 62 through which a coolant (for example, cooling water) for cooling the gas flows are formed.

The plurality of gas flow paths 61 are provided in the gas introduction portion 60, and each gas flow path 61 has a hexagram-shaped cross section. The gas flow path 61 is provided to extend along the gas introduction portion 60, that is, extend spirally from the first end side to the second end side in the axial direction.

An inflow port 61a of the gas flow path 61 communicates with a gas outflow port of the gas turbine engine 2, and an outflow port 61b of the gas flow path 61 communicates with the accommodation space S1 of the housing 40. The gas exchanges heat with the coolant flowing through the coolant flow path 62 while flowing from the inflow port 61a to the outflow port 61b, and is cooled.

The plurality of coolant flow paths 62 are provided in the gas introduction portion 60, and each coolant flow path 62 has a regular hexagonal cross section. Similarly to the gas flow path 61, the coolant flow path 62 is provided to extend along the gas introduction portion 60, that is, extend spirally from the first end side to the second end side in the axial direction of the power generator 1. When viewing a cross section of the gas introduction portion 60 as shown in FIG. 3, the gas flow paths 61 are arranged in a zigzag manner or a staggered manner, and the coolant flow paths 62 are arranged between and/or around the gas flow paths 61. In this manner, since the plurality of coolant flow paths 62 are arranged in a manner of surrounding one gas flow path 61, a gas cooling efficiency can be enhanced.

Although not shown, an inflow port 62a and the outflow port 62b of the coolant flow path 62 communicate with an external coolant flow path provided outside the housing 40. A heat exchanger and a pump are separately provided with the external coolant flow path. According to such a configuration, the coolant circulates through the flow paths formed by the coolant flow paths 62 and the external coolant flow path, and the coolant that can cool the gas is supplied to the coolant flow paths 62 of the gas introduction portion 60. The coolant may flow through the coolant flow paths 62 from the second end side to the first end side.

Accordingly, the gas flow paths 61 and the coolant flow paths 62 are provided integrally with the body portion 41, and thus, the gas cooling mechanism is integrated with the body portion 41 of the housing 40. Therefore, it is unnecessary to provide a separate cooling mechanism for the gas flow paths 61, which leads to weight reduction of the power generator 1. Since the coolant flow path 62 is provided to extend from the first end side to the second end side along the gas flow path 61, the gas is efficiently and sufficiently cooled along the gas flow path 61. Furthermore, since the gas flow path 61 and the coolant flow path 62 are spirally provided, a sufficient length of the flow path from the first end side to the second end side can be secured, cooling of the gas can be further promoted.

Returning to FIG. 1, the gas discharged from the outflow port 61b of the gas flow path 61 is supplied to the accommodation space S1 on the second end side. The gas discharged into the accommodation space S1 is supplied to a gap 63, a so-called air gap between the rotor 20 and the stator 30, and flows through the gap 63 from the second end side to the first end side to cool the rotor 20 and the stator 30.

Accordingly, the housing 40 of the power generator 1 has the coolant flow path 62 that adequately cools the gas of the gas turbine engine 2, and the gas can be utilized to cool the rotor 20 and stator 30. Therefore, the energy efficiency of the entire power generation system 100 including the power generator 1 and the gas turbine engine 2 can be enhanced.

The accommodation space S1 communicates with bearing disposing spaces S2 and S3 (that is, gaps between the bearing holding portions 43 and 44 and the rotor shaft 10) in which the bearings 51 and 52 are disposed, and the gas also flows into the bearing disposing spaces S2 and S3.

Figure 4:
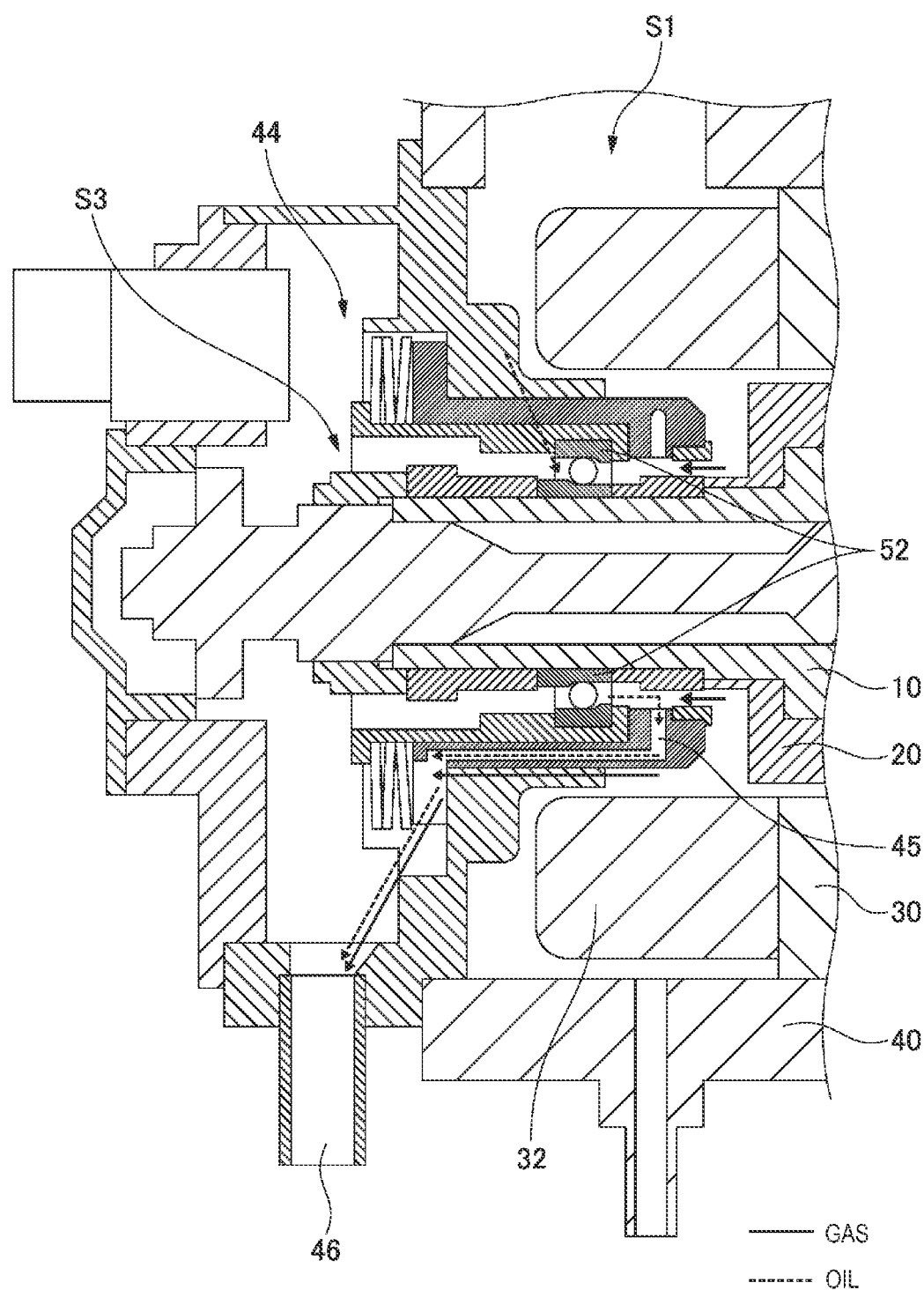
FIG. 4 is an enlarged cross-sectional view of the vicinity of a bearing 52.

FIG. 4 is a partially enlarged view showing the vicinity of the bearing disposing space S3 in which the bearing 52 is disposed in FIG. 1, and the flow of gas is represented by solid lines and a flow of oil is represented by dashed lines. Since the bearing disposing space S2 in which the bearing 51 is disposed also has the same configuration, a description thereof is omitted.

As described above, the bearing 52 is supplied with the oil for lubrication, and the oil flows through the bearing disposing space S3. Since the bearing holding portion 44 is provided with an oil discharge path 45 on the first end side (that is, the rotor 20 side) of the bearing 52, the oil flowing through the bearing disposing space S3 is discharged from the oil discharge path 45 to an outside of the bearing disposing space S3.

However, part of the oil flowing through the bearing disposing space S3 may flow into the accommodation space S1. When the oil flows into the accommodation space S1 and enters the gap 63, friction is generated due to the oil existing in the gap 63 when the rotor 20 rotates, and an output decreases.

In the present embodiment, since the gas flowing inside the accommodation space S1 flows toward the bearing disposing space S3, the oil supplied to the bearing 52 does not enter the accommodation space S1, and the generation of friction as described above can be prevented. Therefore, the rotor 20 can be rotated under a high load and/or high speed environment. Furthermore, since the bearing 52 is cooled by the gas, damage to the bearing 52 whose temperature can become high due to high-speed rotation can be reduced. The oil flowing through the oil discharge path 45 is discharged, together with the gas, to an outside from an oil discharge port 46.

By the way, the flow path provided between the gas outflow port of the gas turbine engine 2 and the inflow port of the gas flow path 61 is branched, and a first end side flow path 64 through which the gas supplied from the gas outflow port flows toward the turbine connecting portion 11 is provided. An outflow port 64a of the first end side flow path 64 communicates with the bearing disposing space S2. According to such a configuration, the oil supplied to the bearing 51 can be prevented from flowing to the gas turbine engine 2 via the turbine connecting portion 11 by causing the gas to flow toward the bearing disposing space S2. Therefore, the output of the gas turbine engine 2 can be prevented from decreasing due to the friction caused by the oil.

The housing 40 of the present embodiment may be, for example, metal additively manufactured, that is, 3D-printing additively manufactured by using powder metal. The metal additive manufacturing is a well-known molding technique in the related art, in which metal powder is melted with an electron beam or a fiber laser, layered and solidified to manufacture metal components, and is a method that enables the molding of metal members with complicated three-dimensional shapes and enables the molding of fine and precise 3D shapes. The gas flow path 61 and the coolant flow path 62 can be integrally formed with the body portion 41 by the 3D-printing additively manufacturing. That is, the housing 40 can be formed as a single component including the body portion 41, the flange portion 42, the gas flow paths 61, and the coolant flow paths 62, which can contribute to weight reduction of the housing 40 and reduction of manufacturing costs. According to the 3D-printing additive manufacturing, lengths and dimensions of the gas flow path 61 and the coolant flow path 62 can be easily designed. Furthermore, the gas flow path 61 and the coolant flow path 62 having complicated shapes for efficiently cooling the gas can be created.

Although the embodiment of the present disclosure has been described above with reference to the accompanying drawings, it is needless to say that the present invention is not limited to the embodiment. It is apparent to those skilled in the art that various changes and modifications can be conceived within the scope of the claims, and it is also understood that such changes and modifications naturally belong to the technical scope of the present invention. In addition, the constituent elements in the above embodiment may be freely combined without departing from the spirit of the present invention.

For example, in the above-described embodiment, the power generator 1 is exemplified as the rotary electric machine of the present disclosure, but the present invention is not limited thereto. The rotary electric machine of the present disclosure may be a motor as a drive source.

In the above-described embodiment, the gas turbine engine 2 is exemplified as the internal combustion engine connected to the rotary electric machine of the present disclosure, but the present invention is not limited thereto. The internal combustion engine may be an internal combustion engine other than a gas turbine engine (for example, a reciprocating engine).

In the above-described embodiment, the configuration in which the high-temperature gas generated in the gas turbine engine 2 coaxially connected to the power generator 1 is supplied to the power generator 1 is exemplified, but the present invention is not limited thereto. For example, the gas may be supplied to the power generator 1 from the gas outflow port of the compressor provided separately from the gas turbine engine 2.

In the above-described embodiment, the coolant flow path 62 provided along the gas flow path 61 is provided as a mechanism for cooling the gas flowing through the gas flow path 61, but the present invention is not limited thereto. For example, the cooling mechanism such as a water jacket may be provided with the body portion 41 to cool the gas flowing through the gas flow path 61. When both the coolant flow path 62 and the water jacket are provided, the coolant flowing through the coolant flow path 62 may be supplied from the water jacket.

In the above-described embodiment, the gas introduction portion 60 has a configuration in which the gas flow path 61 and the coolant flow path 62 are formed in a solid cross section, but the present invention is not limited thereto. The gas flow path 61 and the coolant flow path 62 may be implemented by pipes or the like.

In the above-described embodiment, the cross section of the gas flow path 61 has a hexagram shape and the cross section of the coolant flow path 62 has a hexagonal shape, but the shapes are not limited to thereto and can be any shape. These arrangements can also be designed freely.

The present disclosure discloses at least the following matters. Although corresponding constituent elements or the like in the above-described embodiment are shown in parentheses, the present invention is not limited thereto.

(1) A rotary electric machine housing (housing 40) configured to accommodate a component (rotor 20, stator 30, bearings 51 and 52) of a rotary electric machine (power generator 1), the rotary electric machine housing including:

a body portion (body portion 41) configured to be in a hollow shape and having an accommodation space (accommodation space S1) in which the component is accommodated;

a gas flow path (gas flow path 61) provided with the body portion and communicating with a gas outflow port of an internal combustion engine (gas turbine engine 2) connected to the rotary electric machine; and a cooling portion (coolant flow path 62) configured to cool a gas flowing through the gas flow path, in which the gas flow path communicates with the accommodation space of the body portion.

According to (1), the housing includes the gas flow path communicating with the gas outflow port of the internal combustion engine, and the cooling portion configured to cool the gas flowing through the gas flow path, and the gas flow path communicates with the accommodation space of the body portion. Therefore, the gas from the internal combustion engine can be utilized for cooling the component of the rotary electric machine. Therefore, the energy efficiency of the entire power generation system including the rotary electric machine and the internal combustion engine can be enhanced.

(2) The rotary electric machine housing according to (1), in which the cooling portion and the gas flow path are provided integrally with the body portion.

According to (2), the cooling portion and the gas flow path are provided integrally with the body portion, and thus, the cooling portion of the gas is integrated with the body portion of the housing. Therefore, it is unnecessary to provide the cooling portion as a separate portion in the rotary electric machine, which leads to weight reduction of the rotary electric machine.

(3) The rotary electric machine housing according to (1) or (2),
in which the cooling portion is a coolant flow path (coolant flow path 62), in which a coolant flows, provided along the gas flow path.

According to (3), since the coolant flow path is provided along the gas flow path, the gas is efficiently cooled along the gas flow path.

(4) The rotary electric machine housing according to (3),
in which the gas flow path and the coolant flow path are provided to extend from an end side (first end side) where the internal combustion engine is provided toward an other end side (second end side) in an axial direction of the rotary electric machine, and
the other end side of the gas flow path communicates with the accommodation space of the body portion.

According to (4), the gas flow path and the coolant flow path extend from the end side where the internal combustion engine is provided toward the other end side in the axial direction of the rotary electric machine, and thus, the gas is sufficiently cooled along the gas flow path.

(5) The rotary electric machine housing according to (4),
in which the gas flow path and the coolant flow path are spirally provided with the body portion.

According to (5), the gas flow path and the coolant flow path are spirally provided with the body portion, and thus, sufficient lengths of the paths from the end side where the internal combustion engine is provided to the other end side can be secured, and the cooling of the gas can be further promoted.

(6) The rotary electric machine housing according to any one of (1) to (5),
in which the body portion, the gas flow path, and the cooling portion are integrally formed by additive manufacturing using powder metal.

According to (6), the body portion, the gas flow path, and the cooling portion can be integrally formed by the additive manufacturing using powder metal. This configuration contributes to weight reduction and manufacturing cost reduction. The length of the gas flow path, a dimension of the cooling portion, and the like can be easily designed. Furthermore, the gas flow path and the cooling portion having complicated shapes for efficiently cooling the gas can be created.

(7) A rotary electric machine (power generator 1), including:
the rotary electric machine housing (housing 40) according to any one of (1) to (6); and
a rotor (rotor 20) and a stator (stator 30) accommodated in the body portion,
in which a rotor shaft (rotor shaft 10) of the rotor is connected to a rotating shaft of the internal combustion engine.

According to (7), the gas from the internal combustion engine can be utilized for cooling the rotor and the stator. Therefore, the energy efficiency of the entire power generation system including the rotary electric machine and the internal combustion engine can be enhanced.

(8) The rotary electric machine according to (7),
in which the gas discharged from the gas flow path to the accommodation space is supplied to a gap (gap 63) between the stator and the rotor.

According to (8), the gas discharged from the gas flow path to the accommodation space is supplied to the gap between the stator and the rotor, and thus, the gas from the internal combustion engine can be utilized for cooling the rotor and the stator.

(9) The rotary electric machine according to (7) or (8), further including:
a bearing (bearing 51 and 52) provided in the body portion and configured to support the rotor shaft with respect to the body portion,
in which the gas discharged from the gas flow path to the accommodation space is supplied to a space (bearing disposing spaces S2 and S3) in which the bearing is provided.

According to (9), the gas discharged from the gas flow path to the accommodation space is supplied to the space in which the bearing is provided, and thus, an oil supplied to the bearing does not enter the accommodation space where the stator and rotor are accommodated. Therefore, when the rotor rotates, a decrease in an output due to friction caused by the oil existing in the gap between the rotor and the stator can be prevented. Since the bearing is cooled by the gas, damage to the bearing whose temperature can become high due to high-speed rotation can be reduced.

(10) An additive manufacturing method that additively manufactures the rotary electric machine housing according to any one of (1) to (5) by using powder metal, the additive manufacturing method including:
integrally forming the body portion, the gas flow path, and the cooling portion.

According to (10), the body portion, the gas flow path, and the cooling portion can be integrally formed by the additive manufacturing using powder metal. This configuration contributes to weight reduction and manufacturing cost reduction. The length of the gas flow path, the dimension of the cooling portion, and the like can be easily designed. Furthermore, the gas flow path and the cooling portion having complicated shapes for efficiently cooling the gas can be created.

What is claimed is:
1. A rotary electric machine housing configured to accommodate a component of a rotary electric machine, the rotary electric machine housing comprising:
a body portion configured to be in a hollow shape and having an accommodation space in which the component is accommodated;
a gas flow path provided with the body portion and communicating with a gas outflow port of an internal combustion engine connected to the rotary electric machine; and
a cooling portion configured to cool a gas flowing through the gas flow path,
wherein the gas flow path communicates with the accommodation space of the body portion.

2. The rotary electric machine housing according to claim 1,
   wherein the cooling portion and the gas flow path are provided integrally with the body portion.

3. The rotary electric machine housing according to claim 1,
   wherein the cooling portion is a coolant flow path, in which a coolant flows, provided along the gas flow path.

4. The rotary electric machine housing according to claim 3,
   wherein the gas flow path and the coolant flow path are provided to extend from an end side where the internal combustion engine is provided toward an other end side in an axial direction of the rotary electric machine, and the other end side of the gas flow path communicates with the accommodation space of the body portion.

5. The rotary electric machine housing according to claim 4,
   wherein the gas flow path and the coolant flow path are spirally provided with the body portion.

6. The rotary electric machine housing according to claim 1,
   wherein the body portion, the gas flow path, and the cooling portion are integrally formed by additive manufacturing using powder metal.

7. A rotary electric machine, comprising:
   the rotary electric machine housing according to claim 1; and
   a rotor and a stator accommodated in the body portion,
   wherein a rotor shaft of the rotor is connected to a rotating shaft of the internal combustion engine.

8. The rotary electric machine according to claim 7,
   wherein the gas discharged from the gas flow path to the accommodation space is supplied to a gap between the stator and the rotor.

9. The rotary electric machine according to claim 7, further comprising:
   a bearing provided in the body portion and configured to support the rotor shaft with respect to the body portion,
   wherein the gas discharged from the gas flow path to the accommodation space is supplied to a space in which the bearing is provided.

10. An additive manufacturing method of additively manufacturing the rotary electric machine housing according to claim 1 by using powder metal, the additive manufacturing method comprising:
   integrally forming the body portion, the gas flow path, and the cooling portion.

* * * * *